(12) United States Patent
Zhang et al.

(10) Patent No.: US 11,843,558 B2
(45) Date of Patent: Dec. 12, 2023

(54) TRANSMITTING MULTIPLEXED SOUNDING REFERENCE SIGNAL PORTS IN NEW RADIO

(71) Applicant: QUALCOMM Incorporated, San Diego, CA (US)

(72) Inventors: Yu Zhang, Beijing (CN); Chao Wei, Beijing (CN); Wanshi Chen, San Diego, CA (US); Pavan Kumar Vitthaladevuni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 376 days.

(21) Appl. No.: 16/473,917

(22) PCT Filed: Jan. 8, 2018

(86) PCT No.: PCT/CN2018/071748
§ 371 (c)(1),
(2) Date: Jun. 26, 2019

(87) PCT Pub. No.: WO2018/127171
PCT Pub. Date: Jul. 12, 2018

(65) Prior Publication Data
US 2021/0135823 A1    May 6, 2021

Related U.S. Application Data

(63) Continuation of application No. PCT/CN2017/070624, filed on Jan. 9, 2017.

(51) Int. Cl.
*H04L 5/00* (2006.01)
*H04B 7/06* (2006.01)

(52) U.S. Cl.
CPC ......... *H04L 5/0051* (2013.01); *H04B 7/0613* (2013.01); *H04L 5/0091* (2013.01)

(58) Field of Classification Search
CPC ... H04L 5/0051; H04L 5/0048; H04B 7/0613; H04B 7/0689
See application file for complete search history.

(56) References Cited

U.S. PATENT DOCUMENTS

| 2010/0215114 A1 | 8/2010 | Kim et al. |
| 2010/0246561 A1* | 9/2010 | Shin ...................... H04L 5/0096 370/345 |

(Continued)

FOREIGN PATENT DOCUMENTS

| CN | 101540631 A | 9/2009 |
| CN | 101867403 A | 10/2010 |

(Continued)

OTHER PUBLICATIONS

International Search Report and Written Opinion—PCT/CN2018/071748—ISA/EPO—dated Mar. 27, 2018.

(Continued)

*Primary Examiner* — Deepa Belur
(74) *Attorney, Agent, or Firm* — QUALCOMM Incorporated

(57) ABSTRACT

Certain aspects of the present disclosure relate to methods and apparatus for transmitting multiplexed sounding reference signal (SRS) ports in communications systems operating according to new radio (NR) technologies. An exemplary method includes obtaining an indication of a technique to use in transmitting sounding reference signals (SRS) via five or more antenna ports in one slot and transmitting the SRS via the five or more antenna ports according to the indicated technique.

32 Claims, 18 Drawing Sheets

(56) References Cited

U.S. PATENT DOCUMENTS

| | | | |
|---|---|---|---|
| 2010/0285762 A1* | 11/2010 | Ko .................. H04L 5/0058 455/127.1 |
| 2011/0164489 A1 | 7/2011 | Papasakellariou et al. |
| 2011/0176517 A1 | 7/2011 | Hu et al. |
| 2012/0014349 A1 | 1/2012 | Chung et al. |
| 2012/0207744 A1* | 8/2012 | Mendlein .............. C12N 15/111 424/130.1 |
| 2013/0189930 A1 | 7/2013 | Kinnunen et al. |
| 2013/0258894 A1* | 10/2013 | Ogawa .................. H04W 24/10 370/252 |
| 2014/0036850 A1* | 2/2014 | Akimoto ............. H04J 13/0062 370/329 |
| 2015/0110037 A1* | 4/2015 | Wu ....................... H04L 5/0048 370/329 |
| 2017/0048717 A1* | 2/2017 | Yoo ....................... H04L 5/1469 |
| 2018/0006788 A1* | 1/2018 | Lee ....................... H04L 5/0051 |
| 2019/0013912 A1* | 1/2019 | Tomeba .................. H04B 7/04 |
| 2021/0135823 A1* | 5/2021 | Zhang .................. H04B 7/0604 |

FOREIGN PATENT DOCUMENTS

| | | | | |
|---|---|---|---|---|
| CN | 102075274 A | | 5/2011 | |
| CN | 102223167 A | | 10/2011 | |
| CN | 102223726 A | | 10/2011 | |
| CN | 102412889 A | | 4/2012 | |
| CN | 103095442 A | * | 5/2013 | .......... H04L 5/0051 |
| CN | 103733539 A | | 4/2014 | |
| CN | 105474595 A | | 4/2016 | |
| EP | 2426831 A1 | | 3/2012 | |
| EP | 2538595 A1 | | 12/2012 | |
| EP | 2560449 A1 | | 2/2013 | |
| EP | 3038281 A1 | * | 6/2016 | .......... H04B 1/7143 |
| TW | 201614968 A | | 4/2016 | |
| WO | 2009152696 A1 | | 12/2009 | |
| WO | 2010048129 A1 | | 4/2010 | |
| WO | WO-2013042982 A1 | * | 3/2013 | .......... H04B 7/0691 |
| WO | 2014077742 A1 | | 5/2014 | |
| WO | WO-2017146766 A1 | * | 8/2017 | .......... H04L 5/0091 |

OTHER PUBLICATIONS

International Search Report and Written Opinion—PCT/CN2017/070624—ISA/EPO—dated Jun. 22, 2017.
Supplementary European Search Report—EP18735874—Search Authority—Munich—dated Jun. 26, 2020.
Taiwan Search Report—TW107100778—TIPO—dated Jul. 30, 2021.

* cited by examiner

TRANSMITTING MULTIPLEXED SOUNDING REFERENCE SIGNAL PORTS IN NEW RADIO

This application is a national stage application under 35 U.S.C. 371 of PCT/CN2018/071748, filed Jan. 8, 2018, which claims priority to International Application No. PCT/CN2017/070624, filed Jan. 9, 2017, which are incorporated herein by reference in their entirety for all applicable purposes.

FIELD

The present disclosure relates generally to communication systems, and more particularly, to methods and apparatus for transmitting multiplexed sounding reference signal (SRS) ports in communications systems operating according to new radio (NR) technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for transmitting multiplexed sounding reference signal (SRS) ports. The SRS may provide information concerning the uplink channel which allows frequency dependent scheduling on the uplink by a base station, NodeB, or eNodeB. In one example, the SRS may be used to measure the uplink channel quality over a portion of the uplink channel bandwidth. A UE may be instructed by an eNodeB to transmit the SRS across a particular portion of the uplink channel bandwidth.

Certain aspects provide a method for wireless communication by a user equipment. The method generally includes obtaining an indication of a technique to use in transmitting sounding reference signals (SRS) via five or more antenna ports in one slot and transmitting the SRS via the five or more antenna ports according to the indicated technique.

Certain aspects provide a method for wireless communication by a base station. The method generally includes determining a technique for a user equipment (UE) to use in transmitting sounding reference signals (SRS) via five or more antenna ports in one slot and processing the SRS, according to the determined technique.

Certain aspects provide an apparatus for wireless communication. The apparatus generally includes a processor configured to obtain an indication of a technique to use in transmitting sounding reference signals (SRS) via five or more antenna ports in one slot and to cause the apparatus to transmit the SRS via the five or more antenna ports according to the indicated technique, and a memory coupled with the processor.

Certain aspects provide an apparatus for wireless communication. The apparatus generally includes a processor configured to determine a technique for a user equipment (UE) to use in transmitting sounding reference signals (SRS) via five or more antenna ports in one slot and to process the SRS according to the determined technique, and a memory coupled with the processor.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
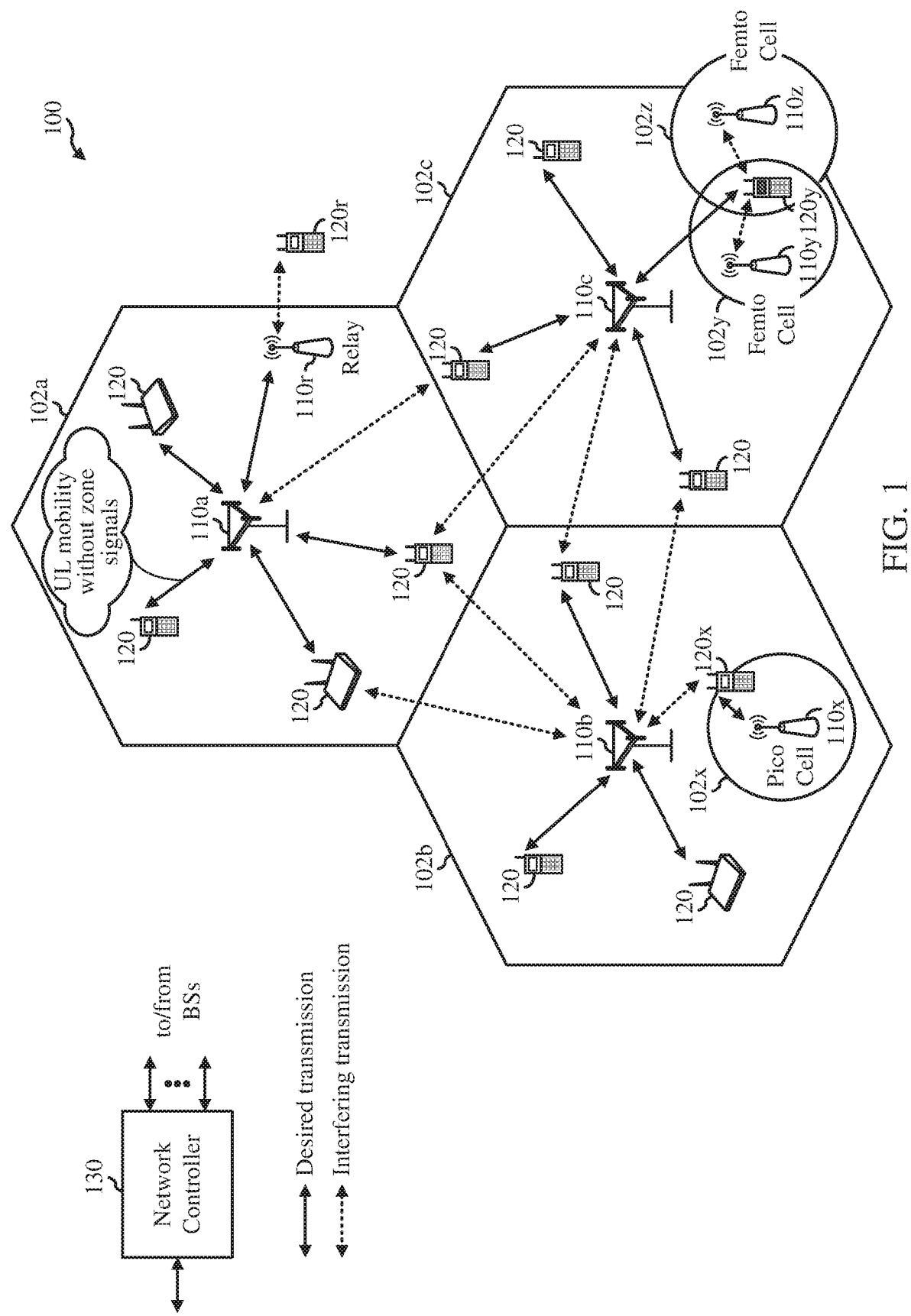
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g., 80 MHz and beyond), millimeter wave (mmW) targeting high carrier frequency (e.g., 27 GHz and higher), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to multiplexing sounding reference signals (SRS) transmitted on multiple antenna ports. According to aspects of the present disclosure, a UE may obtain an indication (e.g., from a BS or from a configuration of the UE) to transmit a SRS via a plurality of antenna ports during one slot. In examples, UEs may multiplex SRS transmitted via various antenna ports by transmitting the SRS using differing combs of subcarriers of a bandwidth, using differing cyclic shifts of a sequence, using combs with differing repetition factors (RPF), using differing time division orthogonal cover codes (TD-OCC), using differing frequency division orthogonal cover codes (FD-OCC), by transmitting the SRS via the various antenna ports on different subbands of bandwidth, or by combining any or all of the listed techniques.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA). Ultra Mobile Broadband (UMB). IEEE 802.11 (Wi-Fi), IEEE 802.16 (WiMAX), IEEE 802.20. Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS. LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed, for example, for enabling connectivity sessions and internet protocol (IP) establishment, as described in greater detail below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB. Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types. e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x. 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an FDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
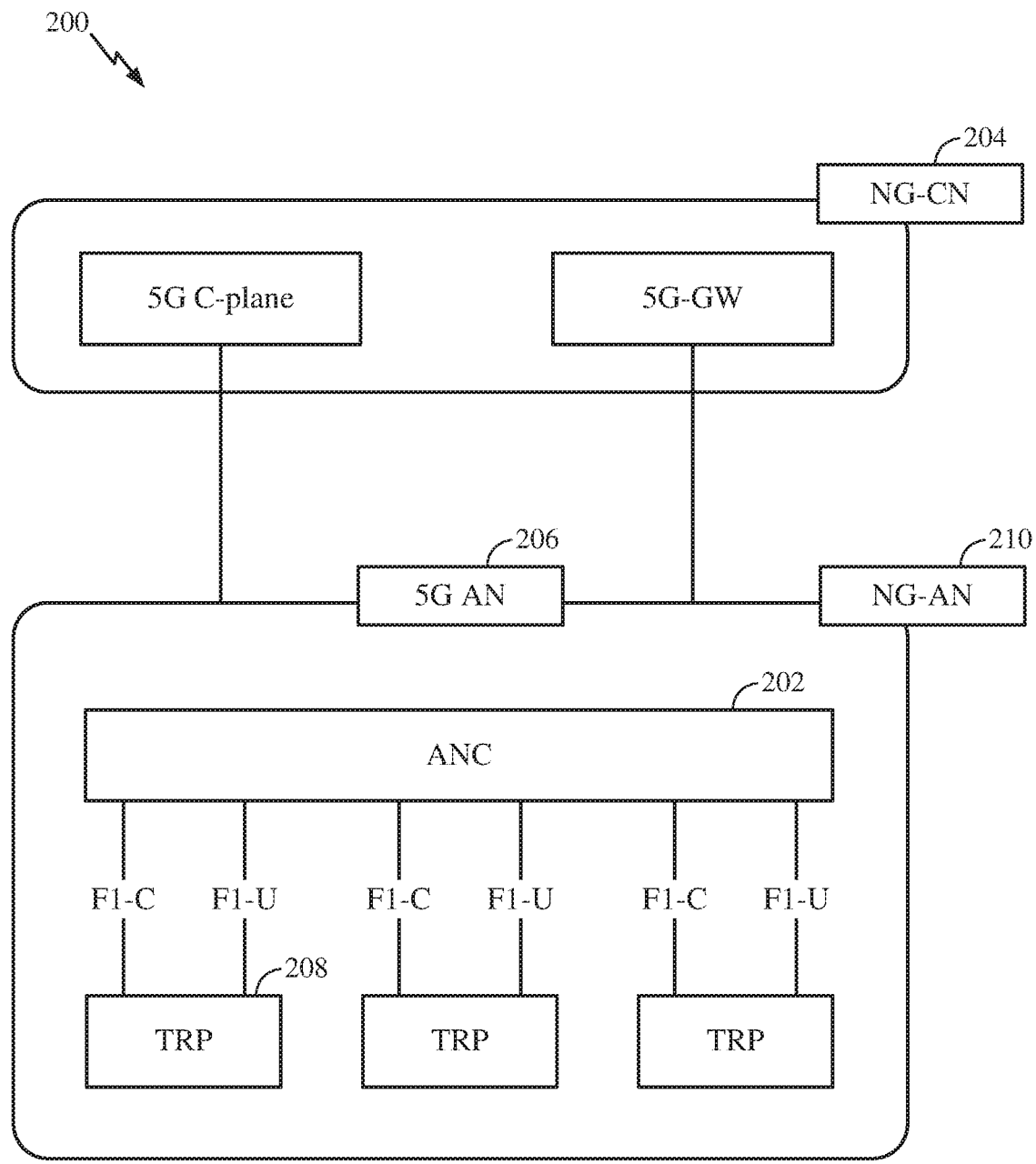
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs. Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed or present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
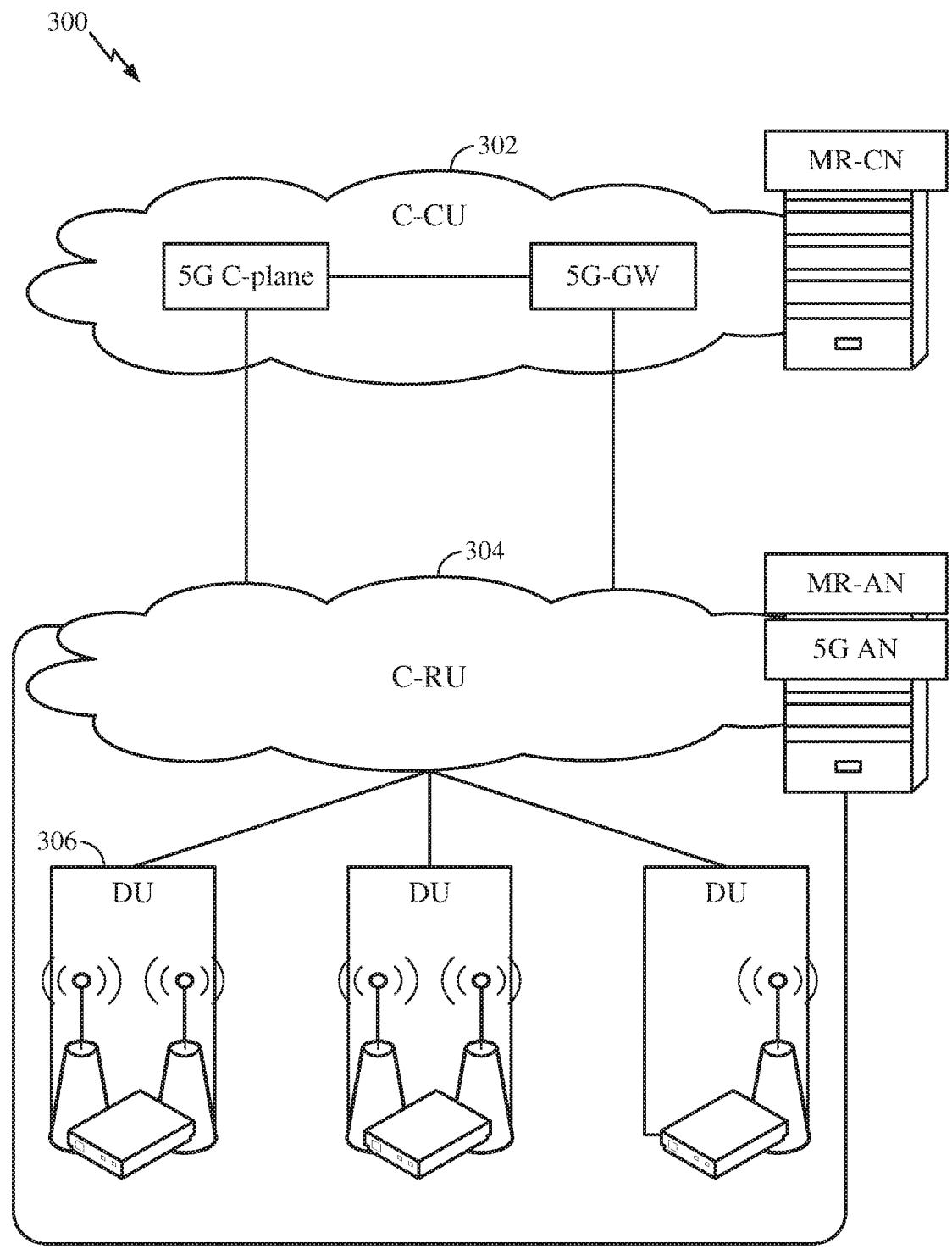
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
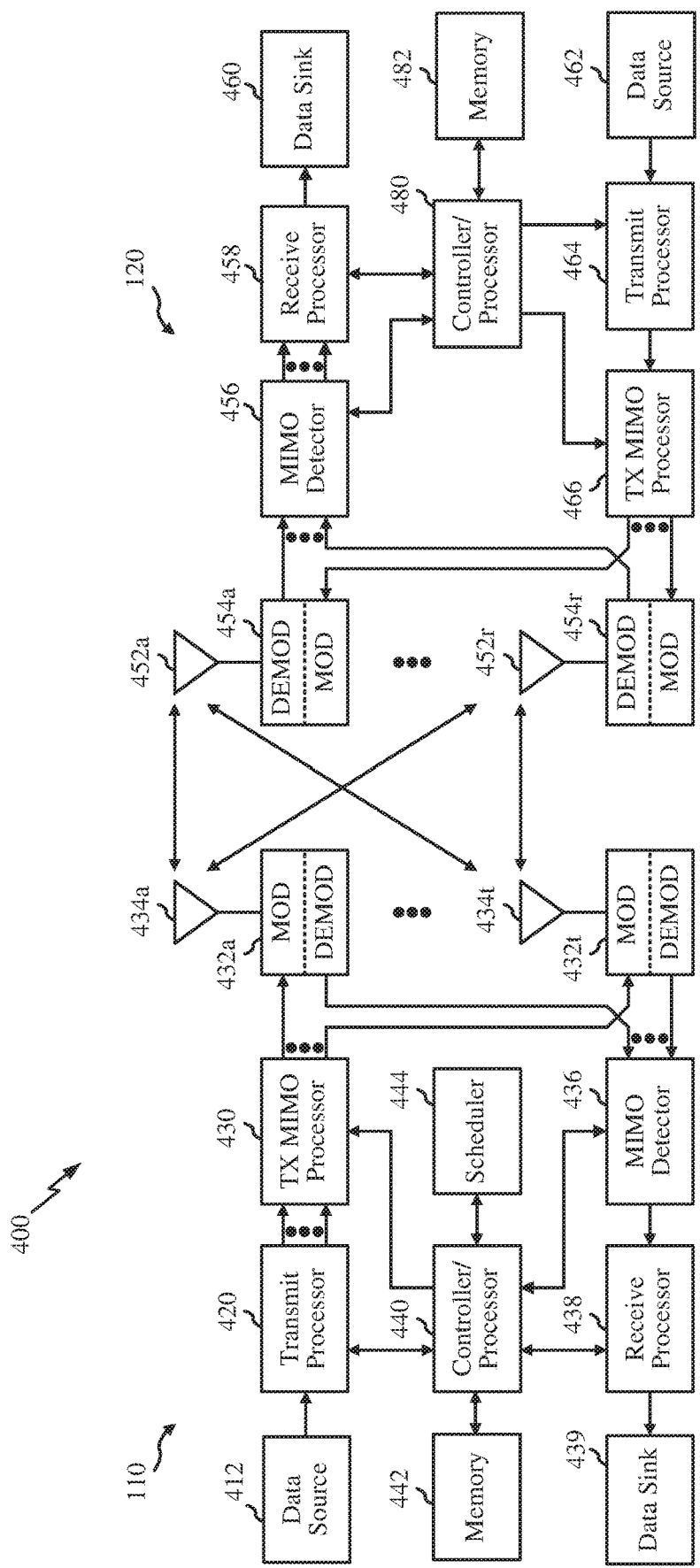
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 13, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
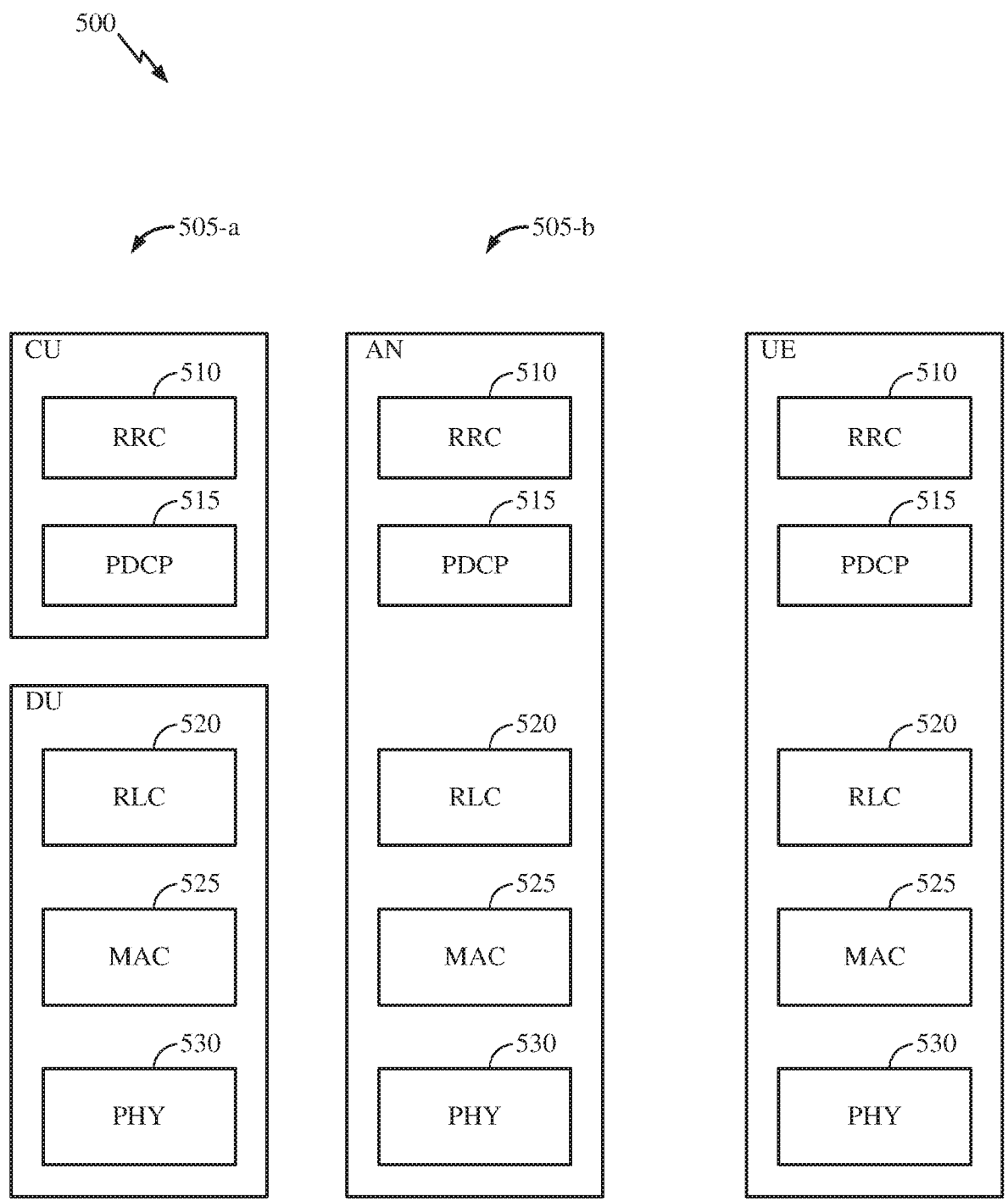
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
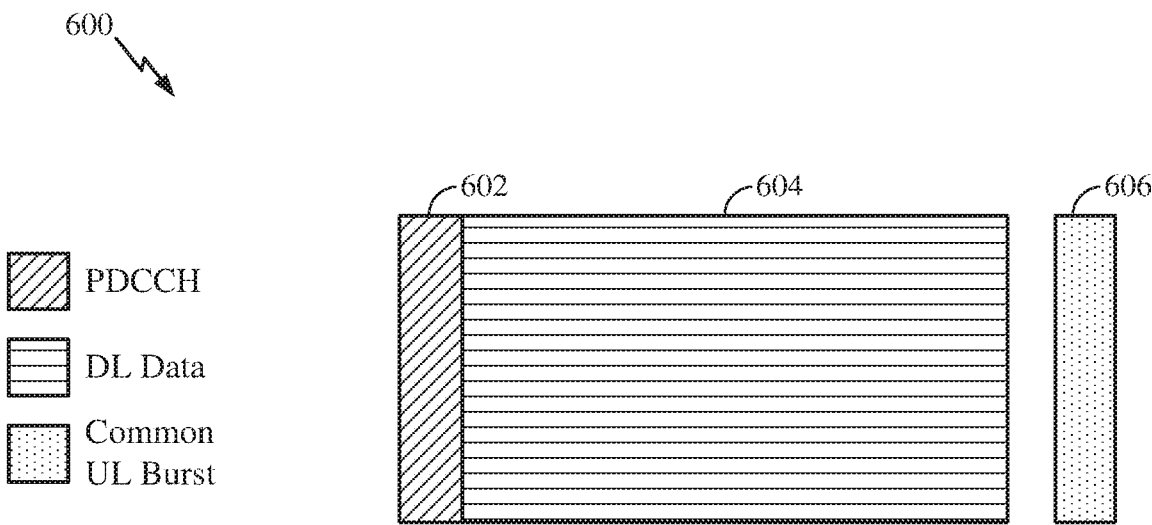
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
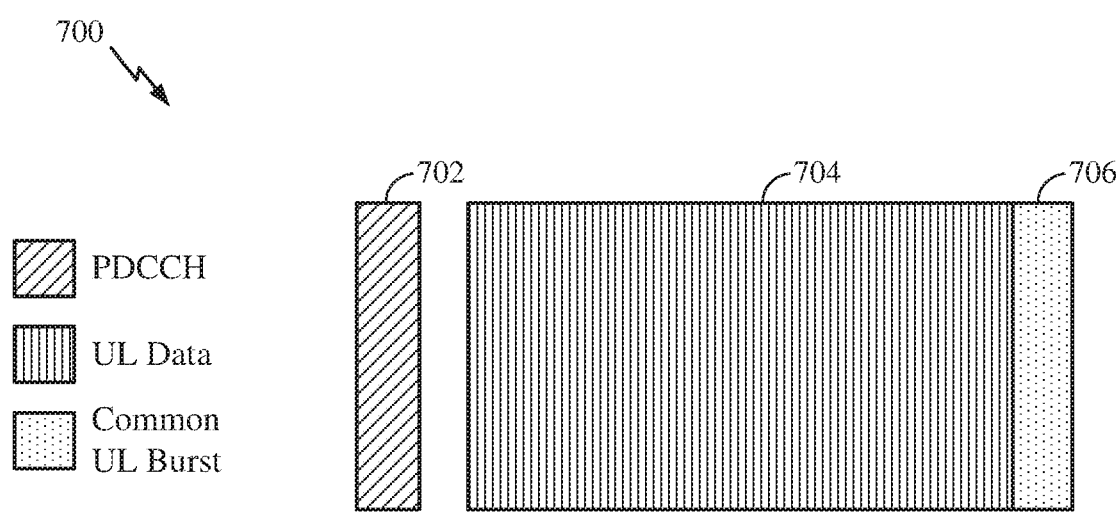
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Techniques for Transmitting Multiplexed Sounding Reference Signal Ports

In communications systems operating according to LTE standards, a UE can be configured for SRS transmission on 1, 2 or 4 antenna ports for UL link adaptation to support UL SU-MIMO w/up to 4 layers, e.g., for determining transmitted precoding matrix indicator (TPMI), rank, and modulation and coding scheme (MCS). A UE may also transmit SRS using multiple antenna ports for DL link adaptation when channel reciprocity is available, e.g., for determining DL precoding matrix.

Figure 8:
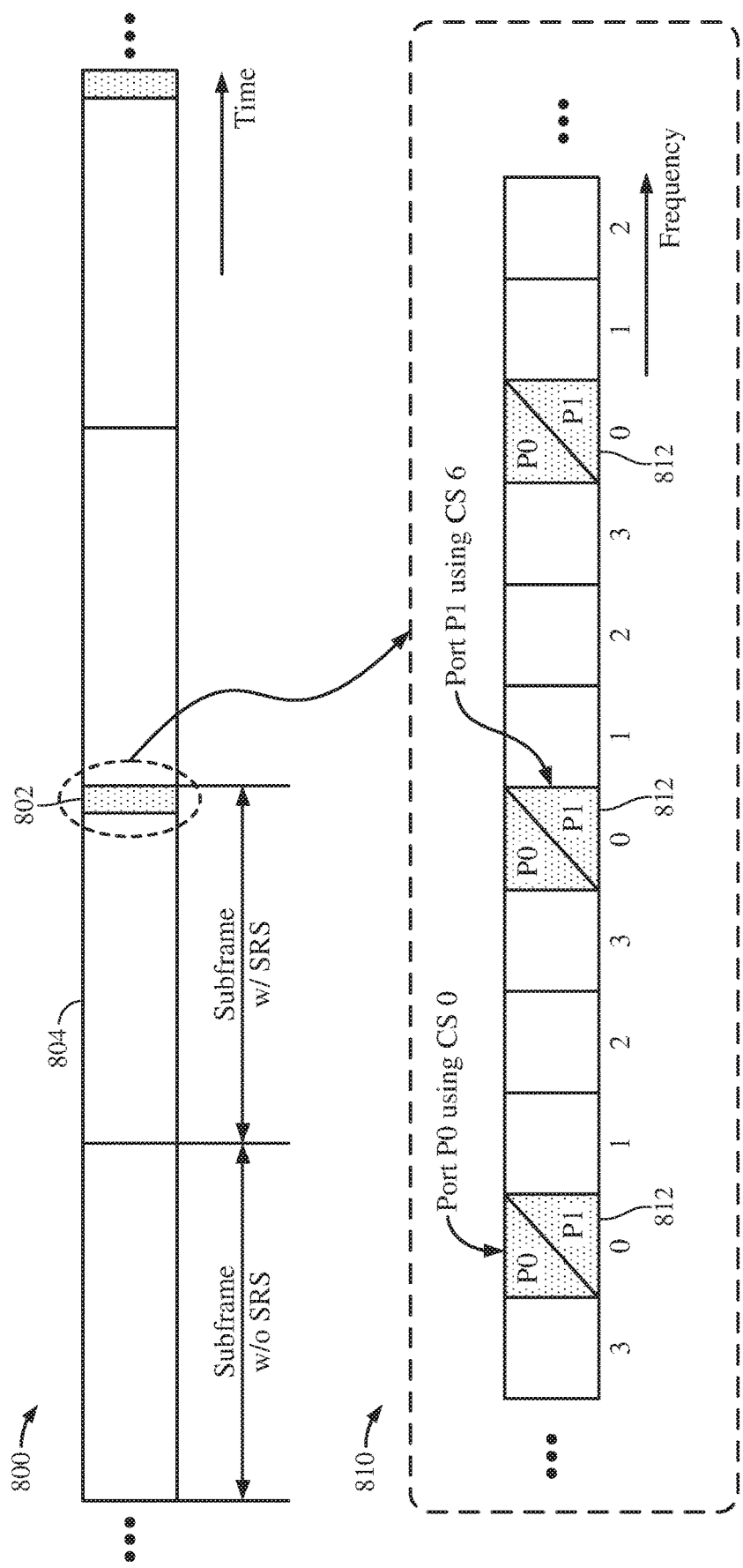
FIG. 8 illustrates an example of multi-port SRS transmission, in accordance with certain aspects of the present disclosure.

FIG. 8 illustrates an example 800 of multi-port SRS transmission that may be used by a UE transmitting SRS using 2 or 4 ports. As illustrated, all ports (e.g., ports 0, 1, 2, and 3) are transmitted within one SC-FDMA symbol 802 of one subframe 804 on the same comb 812 of subcarriers 810 in the bandwidth using orthogonal sequences (e.g., up to 4 cyclically shifted versions of a common root sequence).

Figure 9:
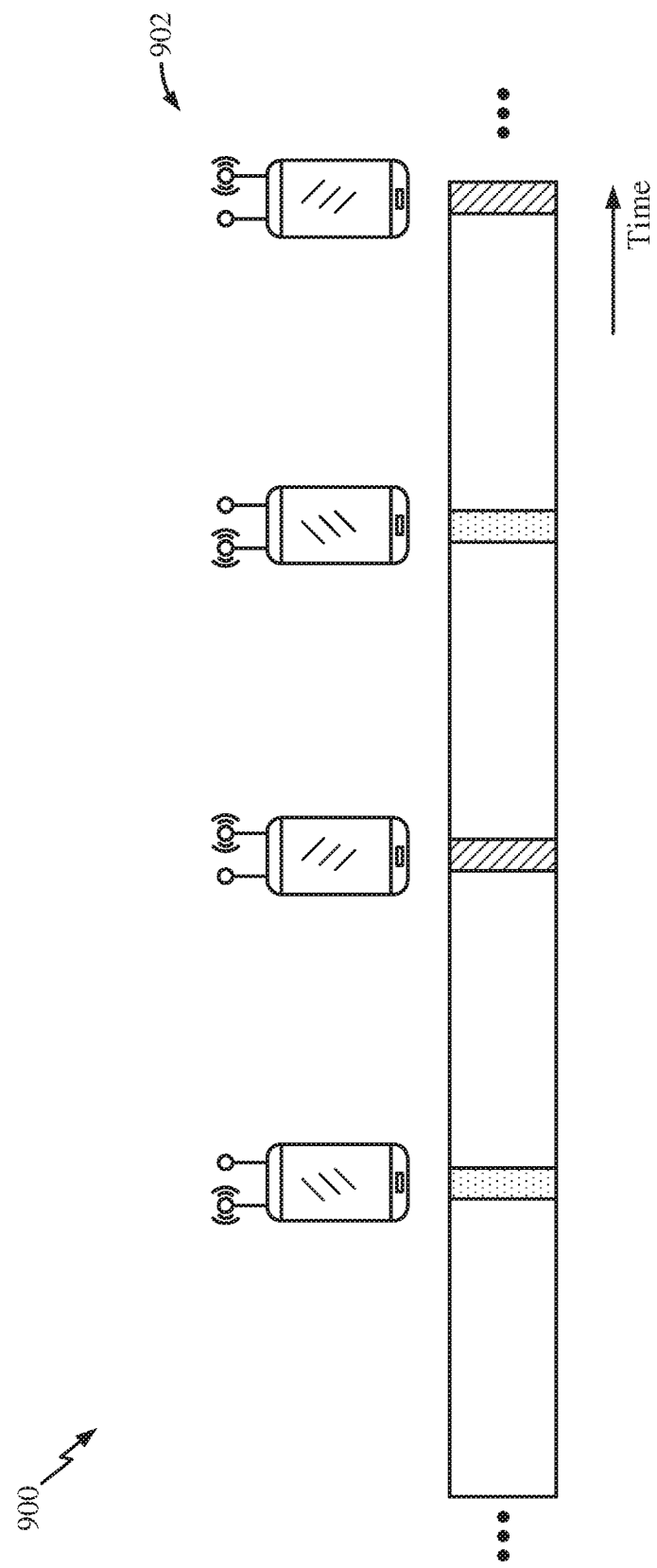
FIG. 9 illustrates an example of single-port SRS transmission, in accordance with certain aspects of the present disclosure.

FIG. 9 illustrates an example 900 of single-port SRS transmission. The single port can be transmitted from 1 out of 2 UE transmit antennas 904a, 904b in an alternating manner. There may be two modes for selecting antennas, closed loop antenna selection and open loop antenna selection. With closed loop antenna selection, UE will select one of the antennas based on the network's indication. With open loop, it is up to the UE to select the antenna.

SRS are transmitted using an interleaved frequency division multiple access (IFDMA) waveform, which is a special discrete Fourier transform (DFT) spread orthogonal frequency division multiplexing (DFT-S-OFDM) waveform.

NR supports use of a DFT-S-OFDM based waveform and use of a cyclic prefix (CP) orthogonal frequency division multiplexing (CP-OFDM) waveform for uplink transmissions, at least for eMBB uplink transmissions on bandwidths of up to 40 GHz.

According to aspects of the present disclosure, a CP-OFDM waveform may be used for uplink single-stream and multi-stream (e.g., MIMO) transmissions.

While CP-OFDM may be used for all uplink transmissions, in wireless communications systems operating according to NR technologies, a DFT-S-OFDM based waveform may be used for single stream transmissions in which communications from a UE are limited by a link budget for the UE. That is, a UE that is experiencing poor link conditions, for example, due to interference or long distance to a BS, may use DFT-S-OFDM based waveforms for transmitting to the BS to improve the signal strength received by the BS.

In the RAN1 #86bis standards group meeting, for NR standards, one decision reached was that NR should support at least a maximum of 4 layers in uplink SU-MIMO transmissions.

According to aspects of the present disclosure, SRS transmission with more than 4 ports may be needed in NR for UL adaptation to support UL SU-MIMO with more than 4 layers.

According to aspects of the present disclosure, SRS transmission with more than 4 ports may be needed in NR for DL adaptation when channel reciprocity is available and the UE is equipped with more than 4 RX antennas.

Extension of LTE design to support more than 4 SRS ports may encounter some difficulties with the additional numerologies available to NR that are not supported in LTE. NR supports scalable numerology, wherein subcarrier spacing (SCS) could be one of 15 kHz, 30 kHz, 60 kHz, 120 kHz, 240 kHz, or 480 kHz. When a UE is transmitting SRS for multiple ports using only cyclic shifts of a sequence to differentiate the SRS, aliasing at a receiving BS may cause the BS to confuse one cyclic shift with another cyclic shift, causing the BS to incorrectly process an SRS for one port as actually being for another port.

Figure 10:
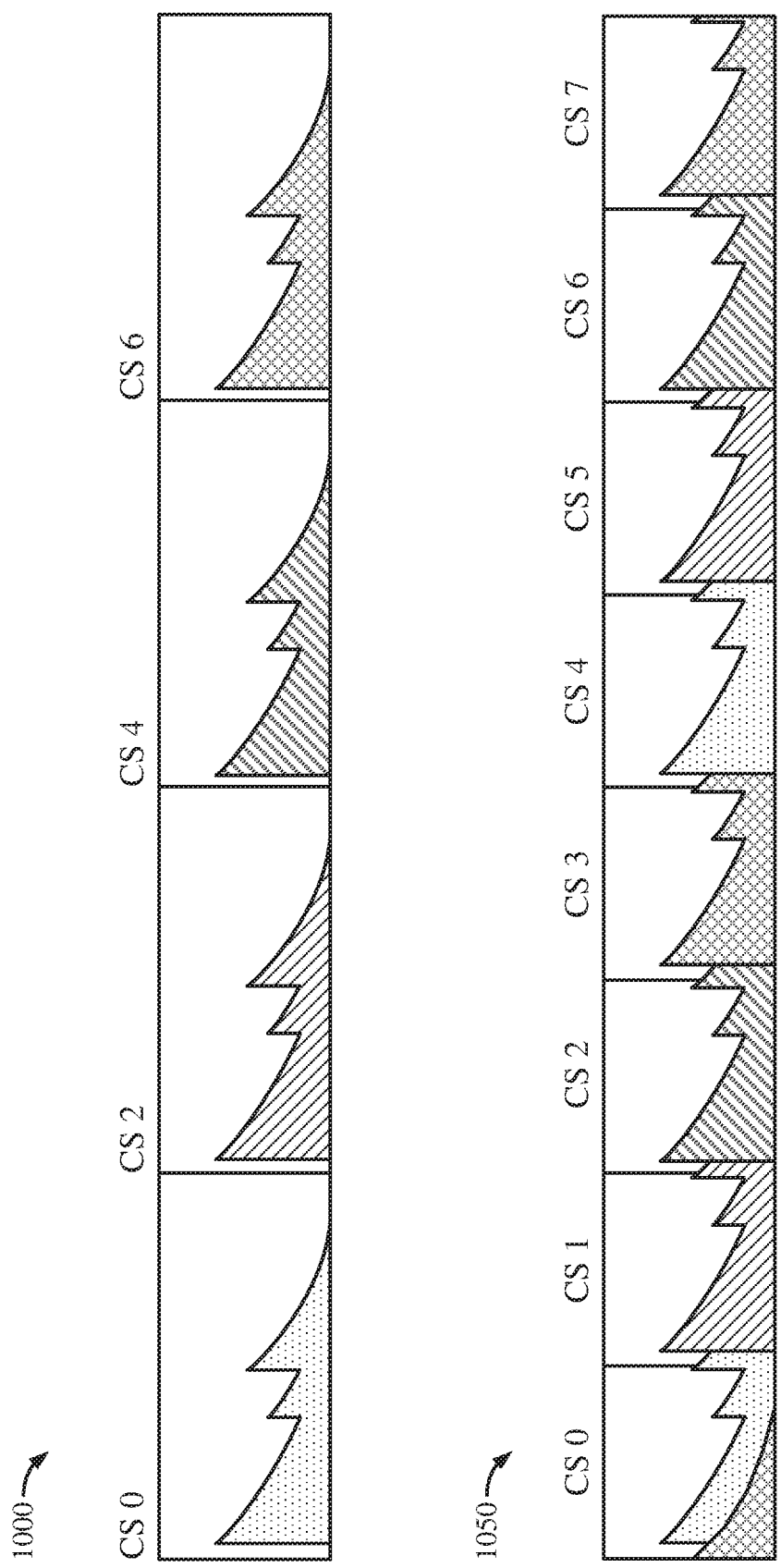
FIG. 10 illustrates examples of transmitting SRS for various numbers of antenna ports, in accordance with certain aspects of the present disclosure.

FIG. 10 illustrates an example 1000 of transmitting SRS for four antenna ports and an example 1050 of transmitting SRS for eight antenna ports. In the examples, a UE is transmitting in a numerology with an SCS of 30 kHz with 4 combs, the effective subcarrier spacing (SCS) of SRS is 120 kHz (i.e. 4×30 kHz). With an effective SCS of 120 kHz, the UE and a receiving device (e.g., a BS) can support a maximum delay of 8.33 μs without the delay causing aliasing between an SRS using one cyclic shift and an SRS using a neighboring cyclic shift. However, the more ports that are multiplexed on one comb, the shorter maximum delay that can be supported for each port. As shown at 1000, with four ports multiplexed on one comb, in the example, the maximum delay that can be supported is 2.08 μs (¼ of 8.33 μs). If the UE is using 8 cyclic shifts (CSs) on one comb to support transmitting SRS via 8 ports, then the per port maximum delay is reduced to 1.04 μs (⅛ of 8.33 μs). If the channel has a longer delay, some aliasing may occur.

Figure 11:
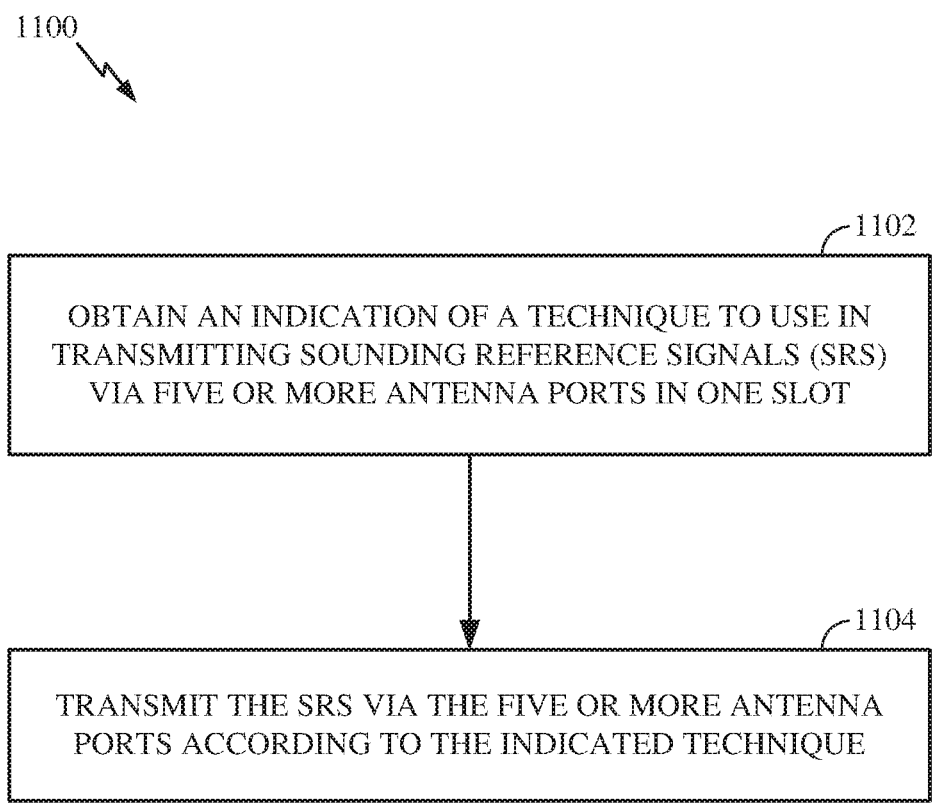
FIG. 11 illustrates example operations for wireless communications, in accordance with certain aspects of the present disclosure.

FIG. 11 illustrates example operations 1100 for wireless communications, according to aspects of the present disclosure. Operations 1100 may be performed by a UE, for example, UE 120, shown in FIG. 1.

Operations 1100 begin, at block 1102, with the UE obtaining an indication of a technique to use in transmitting sounding reference signals (SRS) via five or more antenna ports in one slot. The UE may, for example, obtain the indication from a transmission (e.g., a DCI) from a BS, from a configuration that the UE may obtain from a network entity (e.g., a BS), or by reference to a communications standard.

At block 1104, operations 1100 continue with the UE transmitting the SRS via the five or more antenna ports according to the indicated technique.

Figure 12:
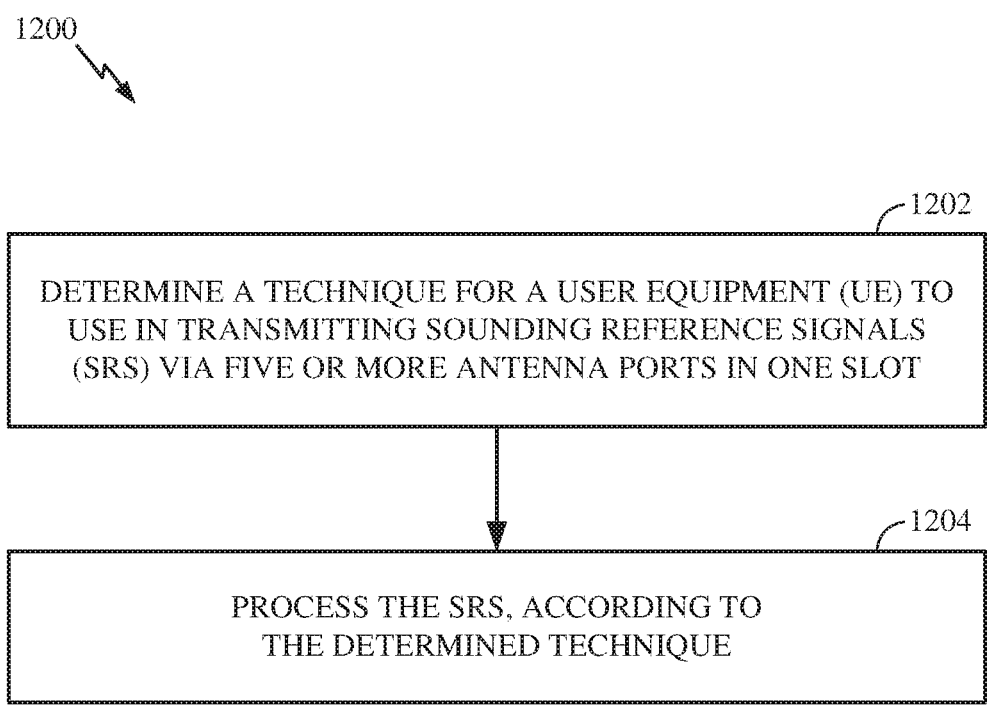
FIG. 12 example operations for wireless communications, in accordance with aspects of the present disclosure.

FIG. 12 illustrates example operations 1200 for wireless communications, in accordance with aspects of the present disclosure. Operations 1200 may be performed by a BS, for example, BS 110, shown in FIG. 1. Operations 1200 may be complementary to operations 1100, described above with reference to FIG. 11.

Operations 1200 begin, at block 1202, with the BS determining a technique for a user equipment (UE) to use in transmitting sounding reference signals (SRS) via five or more antenna ports in one slot. The BS may, for example, determine the technique based on commands (e.g., a DCI) sent to the UE, or by reference to a communications standard.

At block 1204, operations 1200 continue with the BS processing the SRS, according to the determined technique.

According to aspects of the present disclosure, SRSs for all configured transmit antenna ports can be multiplexed and transmitted using one DFT-S-OFDM symbol of one slot, one or more transmission combs with a same repetition factor (RPF), and multiple cyclic shifts, with a same or different set of cyclic shifts on each comb.

Figure 13:
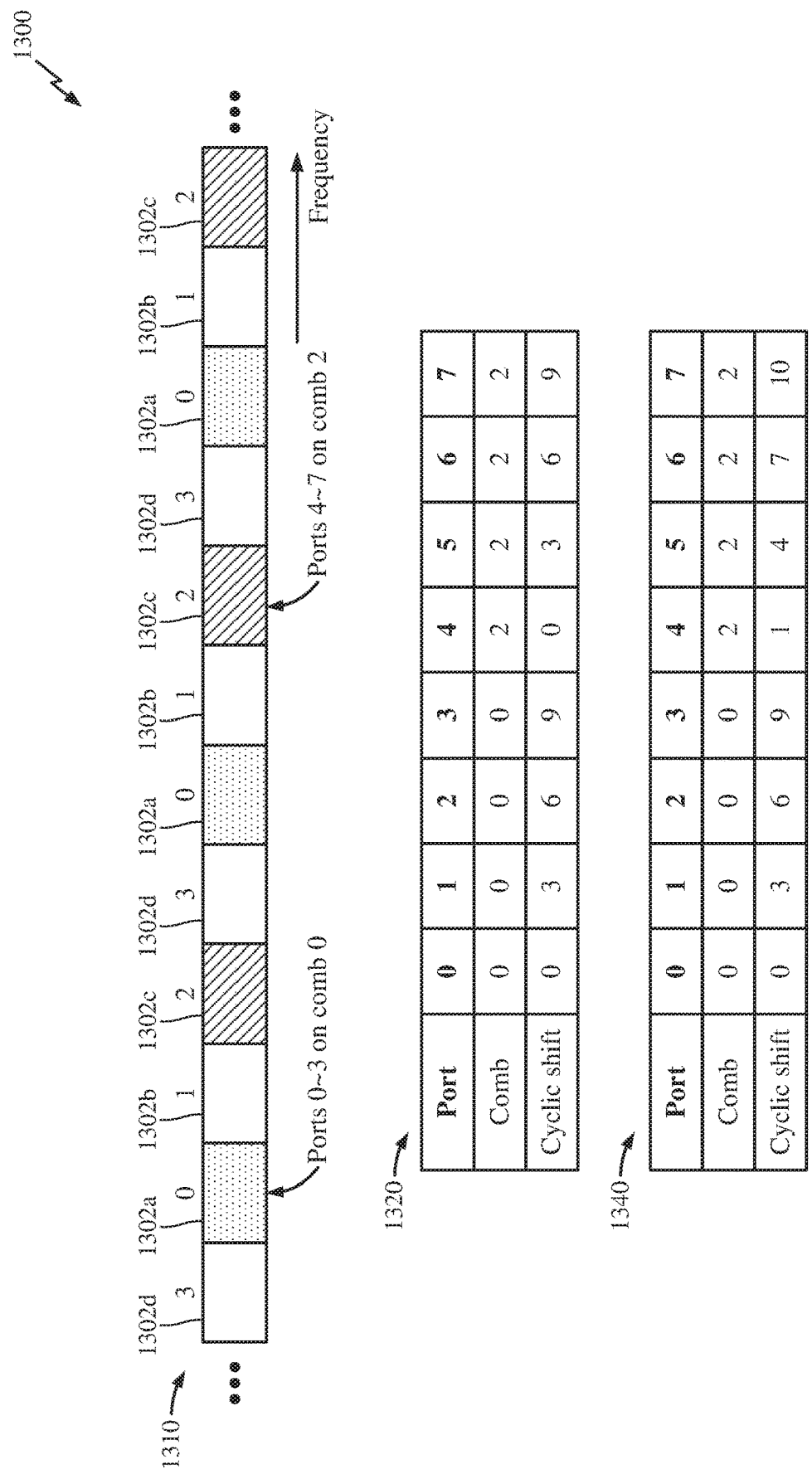
FIG. 13 illustrates a technique for transmitting SRS using up to eight antenna ports, in accordance with certain aspects of the present disclosure.

FIG. 13 illustrates an exemplary technique 1300 for a UE (e.g., UE 120 shown in FIG. 1) to transmit SRS using up to eight antenna ports. In the exemplary technique 1300, the UE may be configured to transmit 8 SRS ports using 2 out of 4 transmission combs 1302 and 4 cyclic shifts. In the exemplary technique, on each comb used for SRS (i.e., combs 1302a and 1302c), 4 ports are multiplexed using 4 different cyclic shifts.

According to aspects of the present disclosure and as shown in the table at 1320, the SRSs transmitted on differing combs may use the same sets of cyclic shifts within each comb. In the exemplary technique 1300, the UE is configured to use combs 1302a and 1302c (combs #0 and #2) to transmit SRS. On comb 1302a (comb #0), up to 4 ports, 0-3, may be multiplexed using a first set of cyclic shifts, and on comb 1302c (comb #2), up to 4 ports, 4-7, may be multiplexed using the same first set of cyclic shifts (e.g., as shown in table 1320) or a different second set of cyclic shifts (e.g., as shown in table 1340), for a total of up to 8 ports used for transmitting SRS during one symbol period 1310. And on each comb, 4 different cyclic shifts may be assigned. The cyclic shifts used with each comb may be the same as shown in 1320, or different as shown in 1340. Multiple combs may be used to multiplex the SRS ports.

According to aspects of the present disclosure and as shown in the table at 1340, the SRSs transmitted on differing combs may use a different set of cyclic shifts within each comb.

According to aspects of the present disclosure, SRS transmitted via different ports configured for a UE may use different RPFs.

In some aspects of the present disclosure, a UE may be configured to transmit SRS using a small RPF for ports in one polarization, while using a larger RPF for ports in another polarization. The small RPF may allow a device (e.g., a BS) processing the SRS to determine channel state with a fine frequency resolution, while the SRS transmitted using larger RPF may be useful for measuring cross-polarization co-phasing.

According to aspects of the present disclosure, a UE may use RPF and/or port dependent power boosting when transmitting multiplexed SRS on various antenna ports. Using a higher transmit power on combs with a larger RPF may enable a device (e.g., a BS) processing the SRS to achieve more processing gain.

Figure 14:
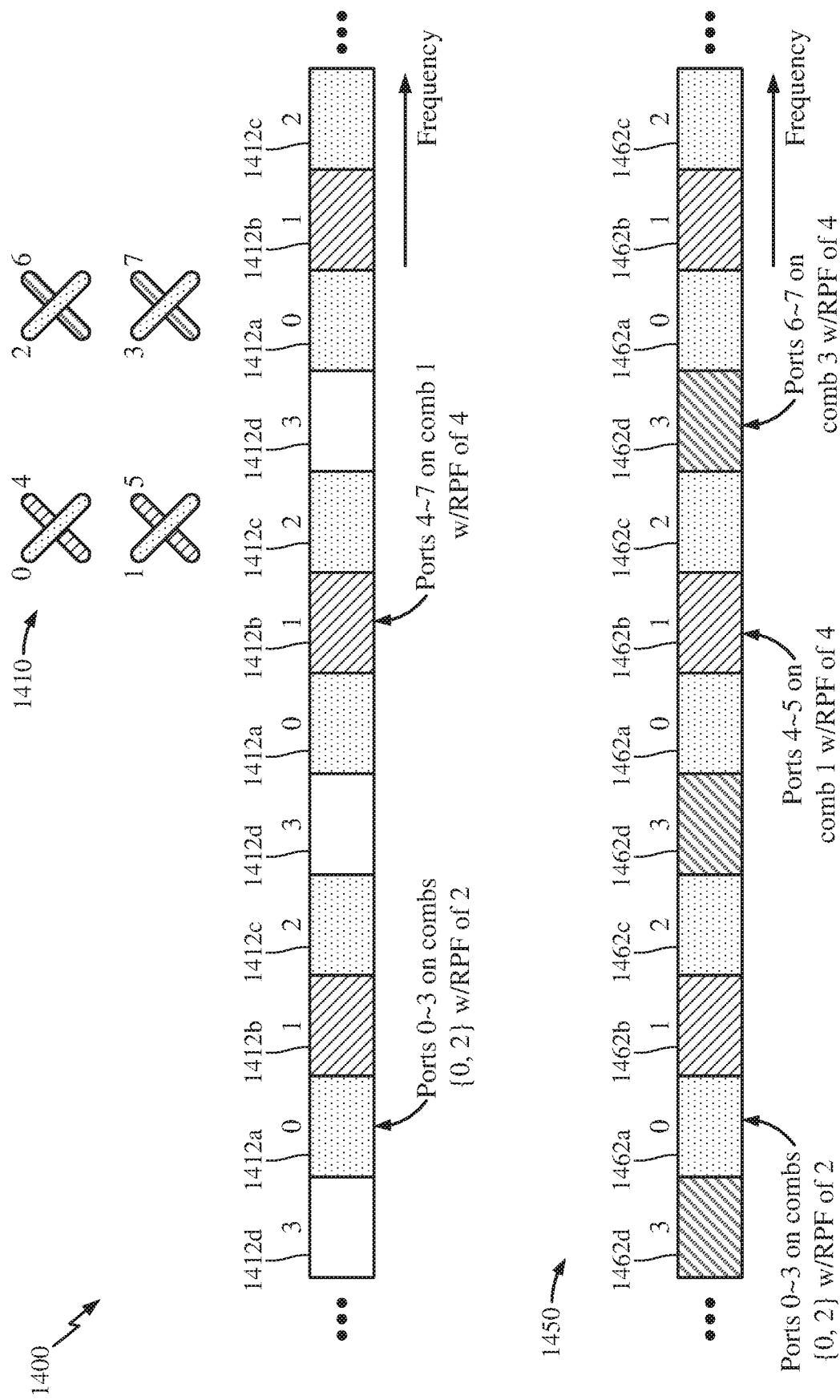
FIG. 14 illustrates a technique for transmitting SRS using repetition factors (RPFs), in accordance with certain aspects of the present disclosure.

FIG. 14 illustrates using RPFs. Specifically, FIG. 14 illustrates exemplary techniques 1400 and 1450 for a UE (e.g., UE 120 shown in FIG. 1) to transmit SRS using various ports with differing RPFs. In the exemplary technique 1400, ports 0-3 have a first polarization, while ports 4-7 have a second polarization, as shown at 1410. In the exemplary technique 1400, a UE is configured to transmit SRS using ports 0-3 using an RPF of 2 on combs 1412a and 1412c (i.e., combs 0 and 2) with 4 different CSs (i.e., one for each port). Still in the exemplary technique 1400, the UE is configured to transmit SRS using ports 4-7 using a RPF of 4 on comb 1412b (i.e., comb 1), again with 4 different CSs.

In the exemplary technique 1450, ports 0-3 still have a first polarization, and ports 4-7 still have a second polarization, as shown at 1410. In the exemplary technique 1450, a UE is configured to transmit SRS using ports 0-3 using an RPF of 2 on combs 1462a and 1462c (i.e., combs 0 and 2) with 4 different CSs (i.e., one for each port). Still in the exemplary technique 1450, the UE is configured to transmit SRS using ports 4-5 using an RPF of 4 on comb 1462b (i.e., comb 1), with 2 different CSs. Still in the exemplary technique 1450, the UE is configured to transmit SRS using ports 6-7 using an RPF of 4 on comb 1452d (i.e., comb 3) with 2 different CSs.

According to aspects of the present disclosure, a UE may be configured to transmit SRSs for all configured transmit antenna ports using multiple DFT-S-OFDM symbols of one slot, time-domain orthogonal cover codes (TD-OCC), one or more transmission combs, and one or more cyclic shifts.

Figure 15:
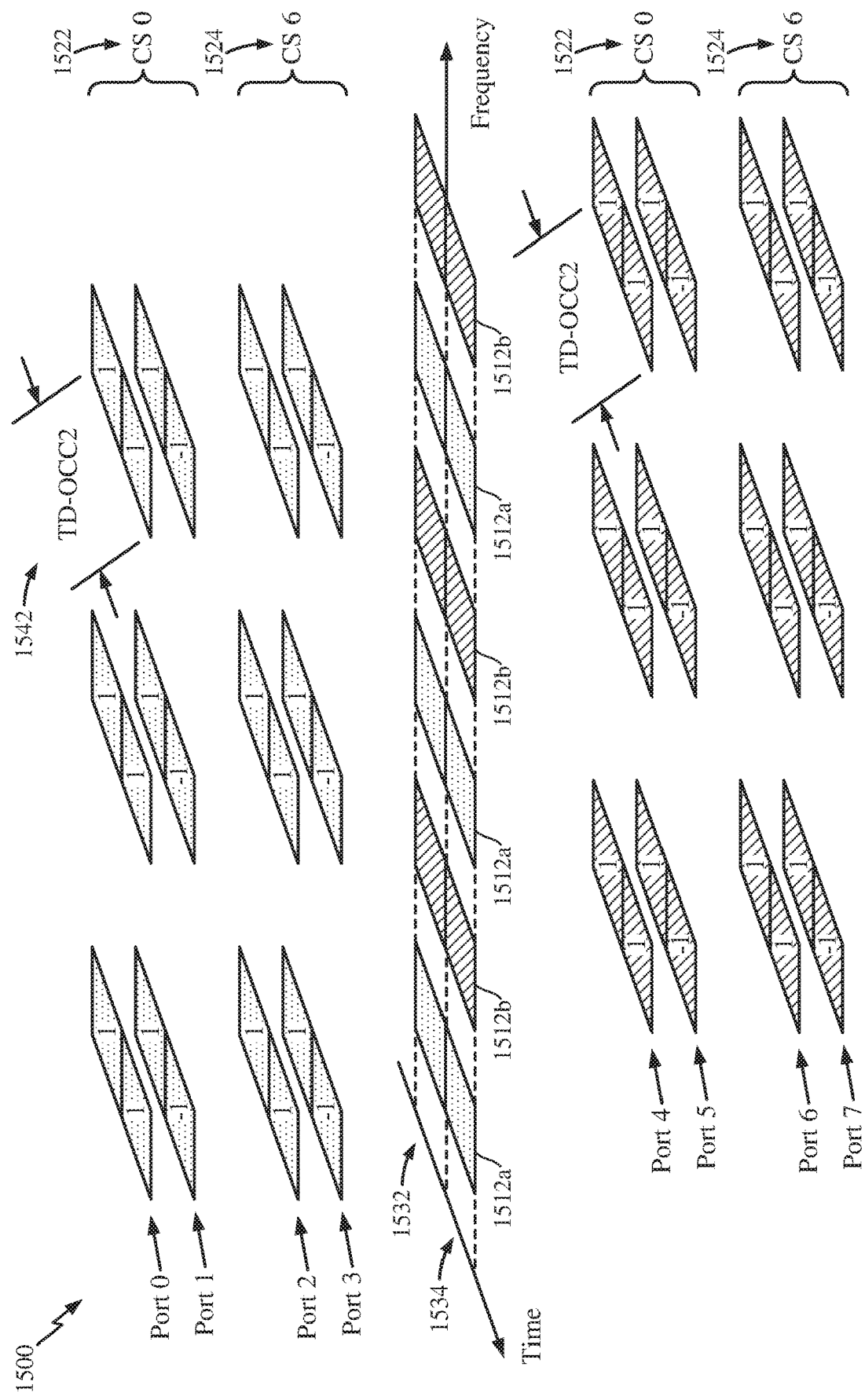
FIG. 15 illustrates a technique for transmitting SRS using multiple symbols with time domain orthogonal cover codes (TD-OCC), in accordance with certain aspects of the present disclosure.

FIG. 15 illustrates using multiple symbols with TD-OCC. Specifically, FIG. 15 illustrates an exemplary technique 1500 for a UE (e.g., UE 120 shown in FIG. 1) to transmit SRS using various ports using multiple DFT-S-OFDM symbols 1532, 1534 of one slot, time-domain orthogonal cover codes (TD-OCC) 1542, one or more transmission combs 1512, and one or more cyclic shifts 1522, 1524. In the exemplary technique 1500, a UE can be configured to transmit SRS using 8 ports using 2 out of 4 transmission combs 1512a and 1512b and 2 cyclic shifts 1522 and 1524 (e.g., cyclic shifts 0 and 6). On each comb, SRS using 4 ports are multiplexed using 2 different cyclic shifts 1522, 1524 and a size-2 TD-OCC 1542. In the exemplary technique 1500, each cyclic shift is associated with 2 ports, and 2 ports using the same cyclic shift are multiplexed using the TD-OCC. While the exemplary technique 1500 shows SRS transmitted on 2 ports using the same cyclic shifts being multiplexed using TD-OCC, the present disclosure is not so limited, and SRS on ports transmitted using TD-OCC may use differing cyclic shifts. Thus, an SRS for each port is orthogonal to the SRS for all other ports because each port is transmitted using a different combination of cyclic shift, transmission comb, and TD-OCC.

According to aspects of the present disclosure, SRSs for all configured transmit antenna ports can be transmitted using one CP-OFDM symbol of one slot with a frequency-domain orthogonal cover code (FD-OCC) in multiple consecutive REs in an RB.

Figure 16:
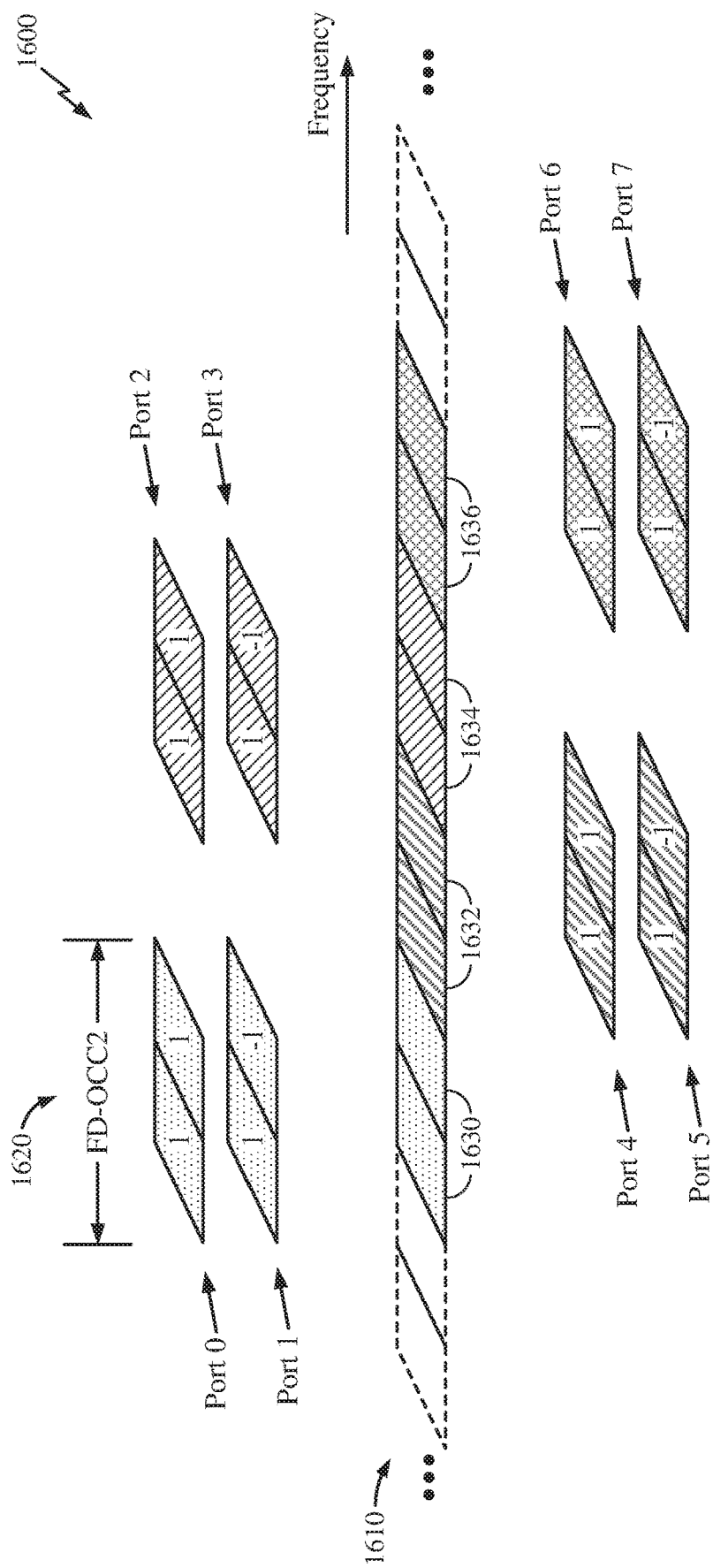
FIG. 16 illustrates a technique for transmitting SRS using consecutive resource elements (REs) with frequency domain orthogonal cover codes (FD-OCC), in accordance with certain aspects of the present disclosure.

FIG. 16 illustrates using consecutive REs with FD-OCC. Specifically, FIG. 16 illustrates an exemplary technique 1600 for a UE (e.g., UE 120 shown in FIG. 1) to transmit SRS using various ports using one CP-OFDM symbol 1610 of one slot with a frequency-domain orthogonal cover code (FD-OCC) 1620 in multiple pairs 1630, 1632, 1634, 1636 of consecutive REs in an RB. In the exemplary technique 1600, SRS on ports {2n, 2n+1} are transmitted on 2 consecutive REs using a size-2 FD-OCC 1620, where n=0, 1, 2, 3. Thus, an SRS for each port is orthogonal to the SRS for all other ports because each port is transmitted using a different combination of FD-OCC and pair of REs.

According to aspects of the present disclosure, SRSs for all configured transmit antenna ports can be transmitted using multiple consecutive CP-OFDM symbols of one slot, consecutive REs, and two-dimensional orthogonal cover codes (OCC).

Figure 17:
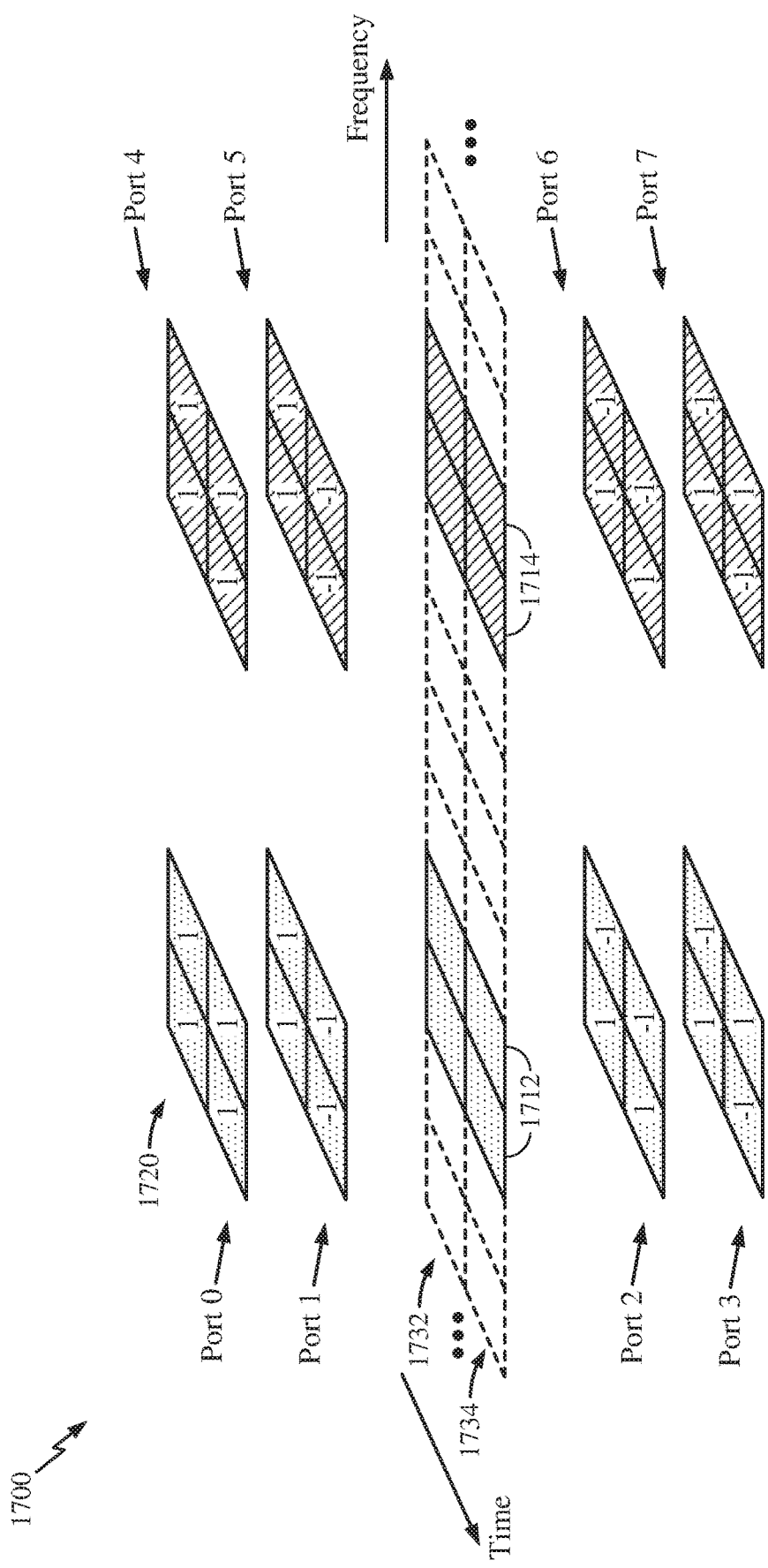
FIG. 17 illustrates a technique for transmitting SRS using consecutive REs in multiple consecutive symbols with code division multiplexing (CDM), in accordance with certain aspects of the present disclosure.

FIG. 17 illustrates using consecutive REs in multiple consecutive symbols with code division multiplexing (CDM) (i.e., orthogonal cover codes). Specifically, FIG. 17 illustrates an exemplary technique 1700 for a UE (e.g., UE 120 shown in FIG. 1) to transmit SRS using various ports using multiple consecutive CP-OFDM symbols 1732, 1734 of one slot, consecutive REs 1712, 1714, and orthogonal cover codes (OCC) 1720. In the exemplary technique 1700, ports {4n, 4n+1, 4n+2, 4n+3} are transmitted on a set 1712 (for n=0) or 1714 (for n=1) of 2 consecutive REs in 2 consecutive symbols 1732, 1734 using a four element orthogonal cover code 1720. An SRS for each port is orthogonal to the SRS for all other ports because each port is transmitted using a different combination of REs and OCC.

According to aspects of the present disclosure, a UE may be configured to transmit SRS using different ports on a same bandwidth part (e.g., subband set) or different bandwidth parts as previous SRS.

In aspects of the present disclosure, a UE can be configured with multiple bandwidth parts (e.g., subband sets), and each SRS for a port or a group of SRS for a group of ports can be associated with one bandwidth part.

According to aspects of the present disclosure, a UE can be configured with multiple bandwidth parts, and each SRS for a port or a group of SRS for a group of ports can be associated with multiple bandwidth parts. One bandwidth part out of the multiple bandwidth parts may be selected for transmitting SRS when the UE determines to transmit an SRS.

In aspects of the present disclosure, a UE can determine which bandwidth part to use for transmitting SRS by following a frequency hopping rule among configured bandwidth parts.

According to aspects of the present disclosure, a UE can determine which bandwidth part to use for transmitting SRS based on an indication received from a network entity (e.g., a BS), for example, a DCI may indicate that the UE is to transmit SRS on a bandwidth part.

Figure 18:
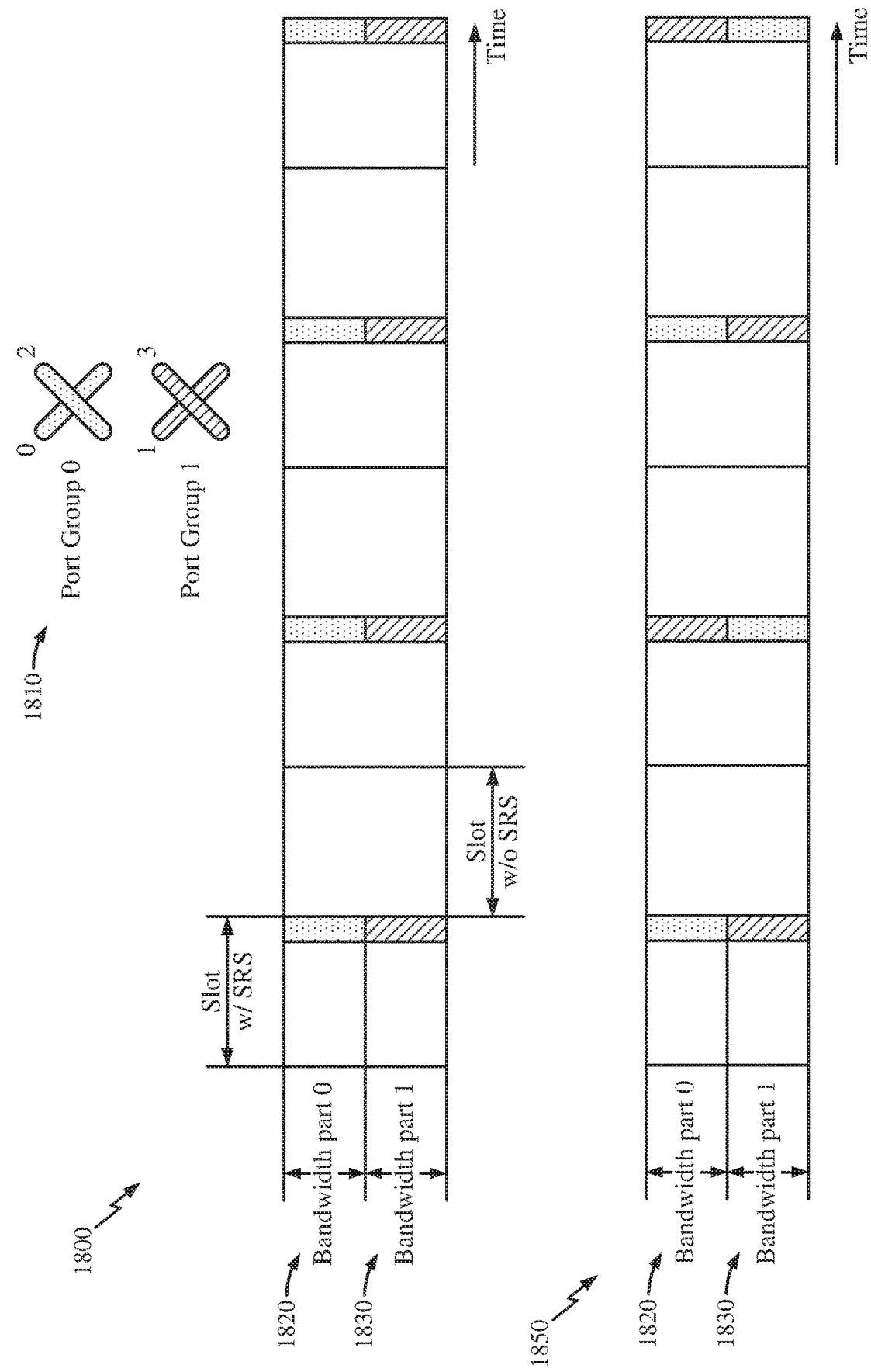
FIG. 18 illustrates a technique for transmitting SRS using port dependent sounding bandwidth, in accordance with certain aspects of the present disclosure.

FIG. 18 illustrates port dependent sounding bandwidth. Specifically, FIG. 18 illustrates exemplary techniques 1800 and 1850 for a UE (e.g., UE 120 shown in FIG. 1) to transmit SRS using different ports on a same bandwidth part (e.g., subband set) or different bandwidth parts as previous SRS. In the exemplary technique 1800, antenna ports are grouped into two groups, as shown at 1810. In the exemplary technique 1800, SRS for ports {2n, 2n+1} are transmitted on bandwidth part n. That is, SRS for port group 0 (e.g., ports 0 and 2) are transmitted on bandwidth part 0, i.e., bandwidth part 1820. Similarly, SRS for port group 1 (e.g., ports 1 and 3) are transmitted on bandwidth part 1. i.e., bandwidth part 1830.

In the exemplary technique 1850, the antenna ports are still grouped into two groups, as shown at 1810. In the exemplary technique 1850, ports {2n, 2n+1} are transmitted on bandwidth parts 0 and 1 alternatively in a frequency hopping pattern that may be similar to open-loop switching. A UE can be configured with one or more frequency hopping patterns and the UE can enable or disable frequency hopping on a pattern or patterns in response to receiving signaling, e.g., setup or release signaling, from a BS or other network entity. The signaling can be L1 signaling (e.g., a DCI), L2 signaling (e.g., a MAC control element (CE)), or higher-layer signaling (e.g., RRC signaling). Multiple frequency hopping patterns can be configured on a UE via higher-layer signaling from a base station or other network entity. The setup or release signaling may further include an indication of which configured hopping pattern the UE is to use for the forthcoming sounding instance.

Figure 19:
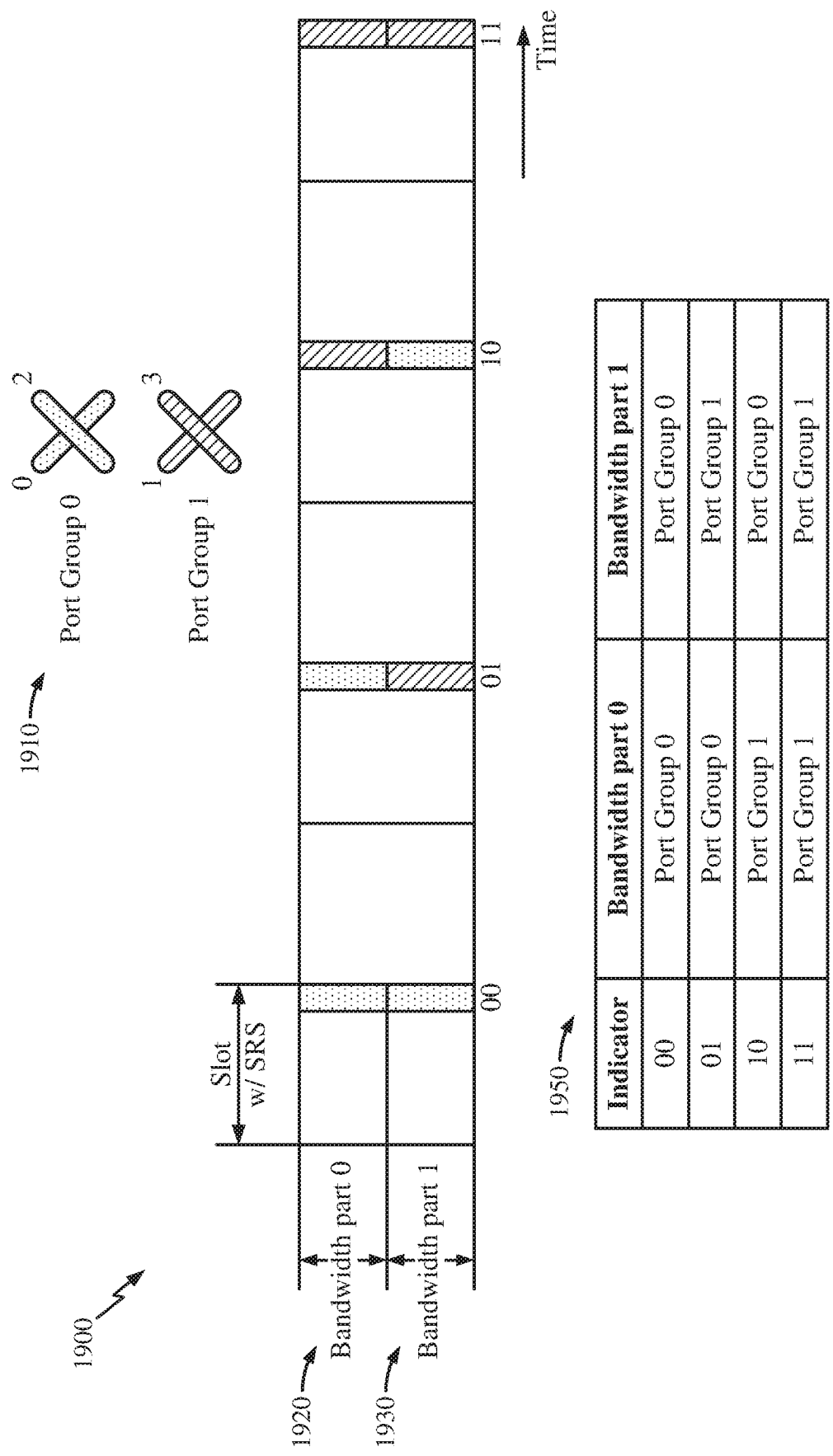
FIG. 19 illustrates a technique for transmitting SRS using different ports on various same bandwidth parts, in accordance with certain aspects of the present disclosure.

FIG. 19 illustrates an exemplary technique 1900 for a UE (e.g., UE 120 shown in FIG. 1) to transmit SRS using different ports on a same bandwidth part (e.g., subband set) or different bandwidth parts as previous SRS. In the exemplary technique 1900, antenna ports are grouped into two groups, as shown at 1910. In the exemplary technique 1900, SRS for ports {2n, 2n+1} are transmitted on bandwidth parts 1920 or 1930 (i.e., bandwidth parts 0 or 1) according to an indication the UE receives from a BS. This technique may be referred to as closed-loop subband-wise SRS port grouping.

The chart at 1950 illustrates one exemplary technique for a BS (e.g., BS 110 shown in FIG. 1) to indicate to a UE (e.g., UE 120 shown in FIG. 1) which port group should be transmitted on which bandwidth part. In the exemplary technique, a BS may transmit (e.g., in a DCI) an indicator of two bits, and a receiving UE may determine on which ports to transmit SRS and on which bandwidth part by referring to the exemplary chart 1950. While the chart at 1950 is an example, the present disclosure is not so limited and other techniques may be used to indicate which port group is to be transmitted on which bandwidth part.

In aspects of the present disclosure, a UE may determine to transmit SRS for a first set of antenna ports at a first periodicity and other SRS for a second set of antenna ports at a second periodicity. For example, a UE may be configured to transmit SRS for ports 0-3 every 5 ms (e.g., a periodicity of 5 ms) and to transmit SRS for ports 4-7 every 10 ms. In the example, the UE may transmit the SRS for ports 0-3 on comb 0 and the SRS for ports 4-7 on comb 2.

According to aspects of the present disclosure, a UE transmitting SRS using different periodicity may be enabled to transmit SRS with a high port density (e.g., transmitting SRS on eight ports) while reducing time and frequency resource overhead caused by transmitting SRS.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s) including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 13, 17, and 18.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment, comprising:
    obtaining an indication of a technique to use in transmitting sounding reference signals (SRSs) via five or more antenna ports in one slot; and
    transmitting the SRSs via the five or more antenna ports in the one slot according to the indicated technique, comprising:
        transmitting first SRSs for a first set of the five or more antenna ports on a first comb of subcarriers of a bandwidth based on a first transmission power; and
        transmitting second SRSs for a second set of the five or more antenna ports on a second comb of the subcarriers of the bandwidth based on a second transmission power, wherein the second set of the five or more antenna ports is different from the first set of the five or more antenna ports, the second comb is different from the first comb, and the first transmission power is different from the second transmission power.

2. The method of claim 1, wherein:
    transmitting the first SRSs comprises transmitting a first SRS for each antenna port, of the first set of the five or more antenna ports, using a different cyclic shift from a first set of cyclic shifts of a sequence; and
    transmitting the second SRSs comprises transmitting a second SRS for each antenna port, of the second set of the five or more antenna ports, using a different cyclic shift from a second set of cyclic shifts of the sequence, wherein the second set of cyclic shifts is different from the first set of cyclic shifts.

3. The method of claim 2, further comprising:
    transmitting third SRSs for a third set of the five or more antenna ports on a third comb of the subcarriers, wherein the third set of the five or more antenna ports is different from the first set of the five or more antenna ports and the second set of the five or more antenna ports and the third comb is different from the first comb and the second comb.

4. The method of claim 1, wherein:
    transmitting the first SRSs comprises transmitting a first SRS for each antenna port, of the first set of the five or more antenna ports, using a different cyclic shift from a first set of cyclic shifts of a sequence; and
    transmitting the second SRSs comprises transmitting a second SRS for each antenna port, of the second set of the five or more antenna ports, using a different cyclic shift from a second set of cyclic shifts of the sequence, wherein the second set of cyclic shifts and the first set of cyclic shifts are identical.

5. The method of claim 1, wherein the first comb of the subcarriers has a different repetition factor (RPF) than the second comb of the subcarriers.

6. The method of claim 1, wherein the indicated technique comprises:
    transmitting, using a first cyclic shift from a first set of cyclic shifts of a sequence, the first SRSs for the first set of the five or more antenna ports during two symbol periods of the slot and applying a time domain orthogonal cover code (TD-OCC) to the first SRSs in the two symbol periods; and
    transmitting, using a second cyclic shift from the first set of cyclic shifts and different from the first cyclic shift, the second SRSs for the second set of the five or more antenna ports, different from the first set of the five or more antenna ports, during the two symbol periods of the slot and applying the TD-OCC to the second SRS in the two symbol periods.

7. The method of claim 1, wherein the indicated technique comprises:
transmitting the first SRSs for the first set of the five or more antenna ports using a first set of two consecutive resource elements (REs) in one symbol period of the slot and applying a frequency domain orthogonal cover code (FD-OCC) to the first SRSs in the first set of the REs; and
transmitting the second SRSs for the second set of the five or more antenna ports, different from the first set of the five or more antenna ports, using a second set of two consecutive REs, different from the first set of two consecutive REs, in the symbol periods of the slot and applying the FD-OCC to the second SRSs in the second set of REs.

8. The method of claim 7, further comprising:
transmitting third SRSs for a third set of the five or more antenna ports using a third set of two consecutive REs during the symbol period and applying the FD-OCC to the third SRSs in third set of the REs, wherein the third set of the five or more antenna ports is different from the first set of the five or more antenna ports and the second set of the five or more antenna ports, and wherein the third set of REs is different from the first set of REs and the second set of REs.

9. The method of claim 8, further comprising:
transmitting fourth SRSs for a fourth set of the five or more antenna ports using a fourth set of two consecutive REs during the symbol period and applying the FD-OCC to the fourth SRSs in a fourth set of the REs, wherein the fourth set of the five or more antenna ports is different from the first set of the five or more antenna ports, the second set of the five or more antenna ports, and the third set of the five or more antenna ports, and wherein the fourth set of REs is different from the first set of REs, the second set of REs, and the third set of REs.

10. The method of claim 1, wherein the indicated technique comprises:
transmitting the first SRSs for the first set of the five or more antenna ports using a first set of two consecutive resource elements (REs) in each of two consecutive symbol periods of the slot and applying a time domain and frequency domain orthogonal cover code (OCC) to the first SRSs in the first set of the REs; and
transmitting the second SRSs for the second set of the five or more antenna ports, different from the first set of the five or more antenna ports, using a second set of two consecutive REs in each of the two consecutive symbol periods, different from the first set of two consecutive REs in each of two consecutive symbol periods, and applying the time domain and frequency domain OCC to the second SRSs in the second set of REs.

11. The method of claim 1, wherein the indicated technique comprises:
transmitting the first SRSs for the first set of the five or more antenna ports on a first bandwidth part of the bandwidth in a first slot; and
transmitting the second SRSs for the second set of the five or more antenna ports on a second bandwidth part of the bandwidth in the first slot, wherein the second bandwidth part is different from the first bandwidth part.

12. The method of claim 11, further comprising:
transmitting third SRSs for a third set of the five or more antenna ports on a third bandwidth part of the bandwidth in the first slot, wherein the third set of the five or more antenna ports is different from the first set of the five or more antenna ports and the second set of the five or more antenna ports and wherein the third bandwidth part is different from the first bandwidth part and the second bandwidth part; and
transmitting fourth SRSs for a fourth set of the five or more antenna ports on a fourth bandwidth part of the bandwidth in the first slot, wherein:
the fourth set of the five or more antenna ports is different from the first set of the five or more antenna ports, the second set of the five or more antenna ports, and the third set of the five or more antenna ports, and
the fourth bandwidth part is different from the first bandwidth part, the second bandwidth part, and the third bandwidth part.

13. The method of claim 11, further comprising:
transmitting the first SRSs on the second bandwidth part in a second slot; and
transmitting the second SRSs on the first bandwidth part in the second slot, wherein the second slot is different from the first slot.

14. The method of claim 1, wherein the indicated technique comprises:
transmitting the first SRSs for the first set of the five or more antenna ports at a first periodicity; and
transmitting the second SRSs for the second set of the five or more antenna ports at a second periodicity, wherein the second periodicity is different from the first periodicity.

15. A method for wireless communications by a base station (BS), comprising:
determining a technique used by a user equipment (UE) in transmitting sounding reference signals (SRSs) via five or more antenna ports in one slot; and
processing the SRSs transmitted via the five or more antenna ports in the one slot according to the determined technique, comprising:
processing first SRSs for a first set of the five or more antenna ports on a first comb of subcarriers of a bandwidth based on a first transmission power; and
processing second SRSs for a second set of the five or more antenna ports on a second comb of the subcarriers of the bandwidth based on a second transmission power, wherein the second set of the five or more antenna ports is different from the first set of the five or more antenna ports, the second comb is different from the first comb, and the first transmission power is different from the second transmission power.

16. The method of claim 15, wherein:
processing the first SRSs comprises processing a first SRS for each antenna port, of the first set of the five or more antenna ports, based on a different cyclic shift from a first set of cyclic shifts of a sequence; and
processing the second SRSs comprises processing a second SRS for each antenna port, of the second set of the five or more antenna ports, based on a different cyclic shift from a second set of cyclic shifts of the sequence, wherein the second set of cyclic shifts is different from the first set of cyclic shifts.

17. An apparatus for wireless communications, comprising:
one or more processors configured to:
obtain an indication of a technique to use in transmitting sounding reference signals (SRSs) via five or more antenna ports in one slot; and
cause the apparatus to transmit the SRSs via the five or more antenna ports in the one slot according to the indicated technique, comprising:
causing the apparatus to transmit first SRSs for a first set of the five or more antenna ports on a first comb of subcarriers of a bandwidth using a first transmission power; and
causing the apparatus to transmit second SRSs for a second set of the five or more antenna ports on a second comb of the subcarriers of the bandwidth using a second transmission power, wherein the second set of the five or more antenna ports is different from the first set of the five or more antenna ports, the second comb is different from the first comb, and the first transmission power is different from the second transmission power; and
a memory coupled with the one or more processors.

18. The apparatus of claim 17, wherein:
transmitting the first SRSs comprises transmitting a first SRS for each antenna port, of the first set of the five or more antenna ports, using a different cyclic shift from a first set of cyclic shifts of a sequence; and
transmitting the second SRSs comprises transmitting a second SRS for each antenna port, of the second set of the five or more antenna ports, using a different cyclic shift from a second set of cyclic shifts of the sequence, wherein the second set of cyclic shifts is different from the first set of cyclic shifts.

19. The apparatus of claim 18, wherein the one or more processors are further configured to:
cause the apparatus to transmit third SRSs for a third set of the five or more antenna ports on a third comb of the subcarriers, wherein the third set of the five or more antenna ports is different from the first set of the five or more antenna ports and the second set of the five or more antenna ports and the third comb is different from the first comb and the second comb.

20. The apparatus of claim 17, wherein:
transmitting the first SRSs comprises transmitting a first SRS for each antenna port, of the first set of the five or more antenna ports, using a different cyclic shift from a first set of cyclic shifts of a sequence; and
transmitting the second SRSs comprises transmitting a second SRS for each antenna port, of the second set of the five or more antenna ports, using a different cyclic shift from a second set of cyclic shifts of the sequence, wherein the second set of cyclic shifts and the first set of cyclic shifts are identical.

21. The apparatus of claim 17, wherein the first comb of the subcarriers has a different repetition factor (RPF) than the second comb of the subcarriers.

22. The apparatus of claim 17, wherein the indicated technique comprises:
transmitting, using a first cyclic shift from a first set of cyclic shifts of a sequence, the first SRSs for the first set of the five or more antenna ports during two symbol periods of the slot and applying a time domain orthogonal cover code (TD-OCC) to the first SRSs in the two symbol periods; and
transmitting, using a second cyclic shift from the first set of cyclic shifts and different from the first cyclic shift, the second SRSs for the second set of the five or more antenna ports, different from the first set of the five or more antenna ports, during the two symbol periods of the slot and applying the TD-OCC to the second SRSs in the two symbol periods.

23. The apparatus of claim 17, wherein the indicated technique comprises:
transmitting the first SRSs for the first set of the five or more antenna ports using a first set of two consecutive resource elements (REs) in one symbol period of the slot and applying a frequency domain orthogonal cover code (FD-OCC) to the first SRSs in the first set of the REs; and
transmitting the second SRSs for the second set of the five or more antenna ports, different from the first set of the five or more antenna ports, using a second set of two consecutive REs, different from the first set of two consecutive REs, in the symbol periods of the slot and applying the FD-OCC to the second SRSs in the second set of REs.

24. The apparatus of claim 23, wherein the one or more processors are further configured to:
cause the apparatus to transmit third SRSs for a third set of the five or more antenna ports using a third set of two consecutive REs during the symbol period; and
apply the FD-OCC to the third SRSs in third set of the REs, wherein the third set of the five or more antenna ports is different from the first set of the five or more antenna ports and the second set of the five or more antenna ports, and the third set of REs is different from the first set of REs and the second set of REs.

25. The apparatus of claim 24, wherein the one or more processors are further configured to:
cause the apparatus to transmit fourth SRSs for a fourth set of the five or more antenna ports using a fourth set of two consecutive REs during the symbol period; and
apply the FD-OCC to the fourth SRSs in a fourth set of the REs, wherein the fourth set of the five or more antenna ports is different from the first set of the five or more antenna ports, the second set of the five or more antenna ports, and the third set of the five or more antenna ports, and wherein the fourth set of REs is different from the first set of REs, the second set of REs, and the third set of REs.

26. The apparatus of claim 17, wherein the indicated technique comprises:
transmitting the first SRSs for the first set of the five or more antenna ports using a first set of two consecutive resource elements (REs) in each of two consecutive symbol periods of the slot and applying a time domain and frequency domain orthogonal cover code (OCC) to the first SRSs in the first set of the REs; and
transmitting the second SRSs for the second set of the five or more antenna ports, different from the first set of the five or more antenna ports, using a second set of two consecutive REs in each of the two consecutive symbol periods, different from the first set of two consecutive REs in each of two consecutive symbol periods, and applying the time domain and frequency domain OCC to the second SRSs in the second set of REs.

27. The apparatus of claim 17, wherein the indicated technique comprises:
transmitting the first SRSs for the first set of the five or more antenna ports on a first bandwidth part of the bandwidth in a first slot; and
transmitting the second SRSs for the second set of the five or more antenna ports on a second bandwidth part of the bandwidth in the first slot, wherein the second bandwidth part is different from the first bandwidth part.

28. The apparatus of claim 27, wherein the one or more processors are further configured to:
cause the apparatus to transmit third SRSs for a third set of the five or more antenna ports on a third bandwidth part of the bandwidth in the first slot, wherein the third set of the five or more antenna ports is different from the first set of the five or more antenna ports and the second set of the five or more antenna ports and wherein the third bandwidth part is different from the first bandwidth part and the second bandwidth part; and
cause the apparatus to transmit fourth SRSs for a fourth set of the five or more antenna ports on a fourth bandwidth part of the bandwidth in the first slot, wherein:
the fourth set of the five or more antenna ports is different from the first set of the five or more antenna ports, the second set of the five or more antenna ports, and the third set of the five or more antenna ports, and
the fourth bandwidth part is different from the first bandwidth part, the second bandwidth part, and the third bandwidth part.

29. The apparatus of claim 27, wherein the one or more processors are further configured to:
cause the apparatus to transmit the first SRSs on the second bandwidth part in a second slot; and
cause the apparatus to transmit the second SRSs on the first bandwidth part in the second slot, wherein the second slot is different from the first slot.

30. The apparatus of claim 17, wherein the indicated technique comprises:
transmitting the first SRSs for the first set of the five or more antenna ports at a first periodicity; and
transmitting the second SRSs for the second set of the five or more antenna ports at a second periodicity, wherein the second periodicity is different from the first periodicity.

31. An apparatus for wireless communications, comprising:
one or more processors configured to:
determine a technique used by a user equipment (UE) in transmitting sounding reference signals (SRSs) via five or more antenna ports in one slot; and
process the SRSs transmitted via the five or more antenna ports in the one slot according to the determined technique, comprising:
processing first SRSs for a first set of the five or more antenna ports on a first comb of subcarriers of a bandwidth based on a first transmission power; and
processing second SRSs for a second set of the five or more antenna ports on a second comb of the subcarriers of the bandwidth based on a second transmission power, wherein the second set of the five or more antenna ports is different from the first set of the five or more antenna ports, the second comb is different from the first comb, and the first transmission power is different from the second transmission power; and
a memory coupled with the one or more processors.

32. The apparatus of claim 31, wherein:
processing the first SRSs comprises processing a first SRS for each antenna port, of the first set of the five or more antenna ports, based on a different cyclic shift from a first set of cyclic shifts of a sequence; and
processing the second SRSs comprises processing a second SRS for each antenna port, of the second set of the five or more antenna ports, based on a different cyclic shift from a second set of cyclic shifts of the sequence, wherein the second set of cyclic shifts is different from the first set of cyclic shifts.

* * * * *